Oct. 11, 1932.  W. C. CLAYTON  1,882,315
AIRCRAFT
Filed Aug. 29, 1931     3 Sheets-Sheet 1

Fig:1.

INVENTOR
Walter C. Clayton
BY
ATTORNEYS

Oct. 11, 1932.  W. C. CLAYTON  1,882,315
AIRCRAFT
Filed Aug. 29, 1931  3 Sheets-Sheet 2

INVENTOR
Walter C. Clayton
BY
ATTORNEYS

Oct. 11, 1932.  W. C. CLAYTON  1,882,315
AIRCRAFT
Filed Aug. 29, 1931  3 Sheets-Sheet 3

*Fig:3.*

INVENTOR
Walter C. Clayton
BY
*Synnestvedt & Lechner*
ATTORNEYS

Patented Oct. 11, 1932

1,882,315

UNITED STATES PATENT OFFICE

WALTER C. CLAYTON, OF JENKINTOWN, PENNSYLVANIA, ASSIGNOR TO PITCAIRN AIRCRAFT, INC., OF PHILADELPHIA, PENNSYLVANIA, A CORPORATION OF PENNSYLVANIA

AIRCRAFT

Application filed August 29, 1931. Serial No. 560,105.

This invention relates to aircraft and is especially concerned with an adjustable seat or the like, particularly for the pilot, which may be moved to different positions at will in order to support the pilot or occupant at any desired level.

As an object of major importance, the invention has in view the provision of an adjustable seat which is capable of relatively long-travel movements, the foregoing being made possible by the use of mechanical structure and the like which is not only durable but which, in addition, is readily operated and simple from the standpoint of installation and the like.

This invention further has in view the provision of manually operable control means by which the seat may easily and quickly be adjusted from one position to another, the control means being arranged for convenient and positive locking at a plurality of different points.

Another object of major importance is the arrangement of the various controls for the aircraft such, for example, as the rudder and brake pedals and usual control stick, in such manner that these controls move with the seat as it is adjusted. This, it will readily be understood by those skilled in the art, is highly desirable since it eliminates differences in the relative positions of the controls and the pilot when seat adjustments are made. The constant relative positions of the controls and the pilot's seat are also of distinct advantage in providing maximum comfort for the pilot regardless of the position in which the seat may be adjusted, since the arm or leg reach to any of the controls does not change upon adjustment.

By the foregoing structure, proper vision for the pilot is assured at all times and he may adjust his position at will to the most convenient height for various different flying conditions as well as in landing and taking off.

More specifically, this invention accomplishes the foregoing by means of pivoted supporting and control parts, no tongue and groove or other sliding guide arrangements being employed. The pivotal arrangement produces the smoothest possible operation, in view of the fact that the parts are not subject to jamming and the like and, in addition, are also very readily lubricated.

How the foregoing, together with other objects and advantages, are obtained, will be apparent from a consideration of the following description making reference to the accompanying drawings, in which—

Figure 3 is a view similar to Figures 1 and 2 but showing a somewhat modified arrangement, this view further illustrating, in full lines, the seat in lowered position and, in dot and dash lines, the seat in raised position.

Figure 1:
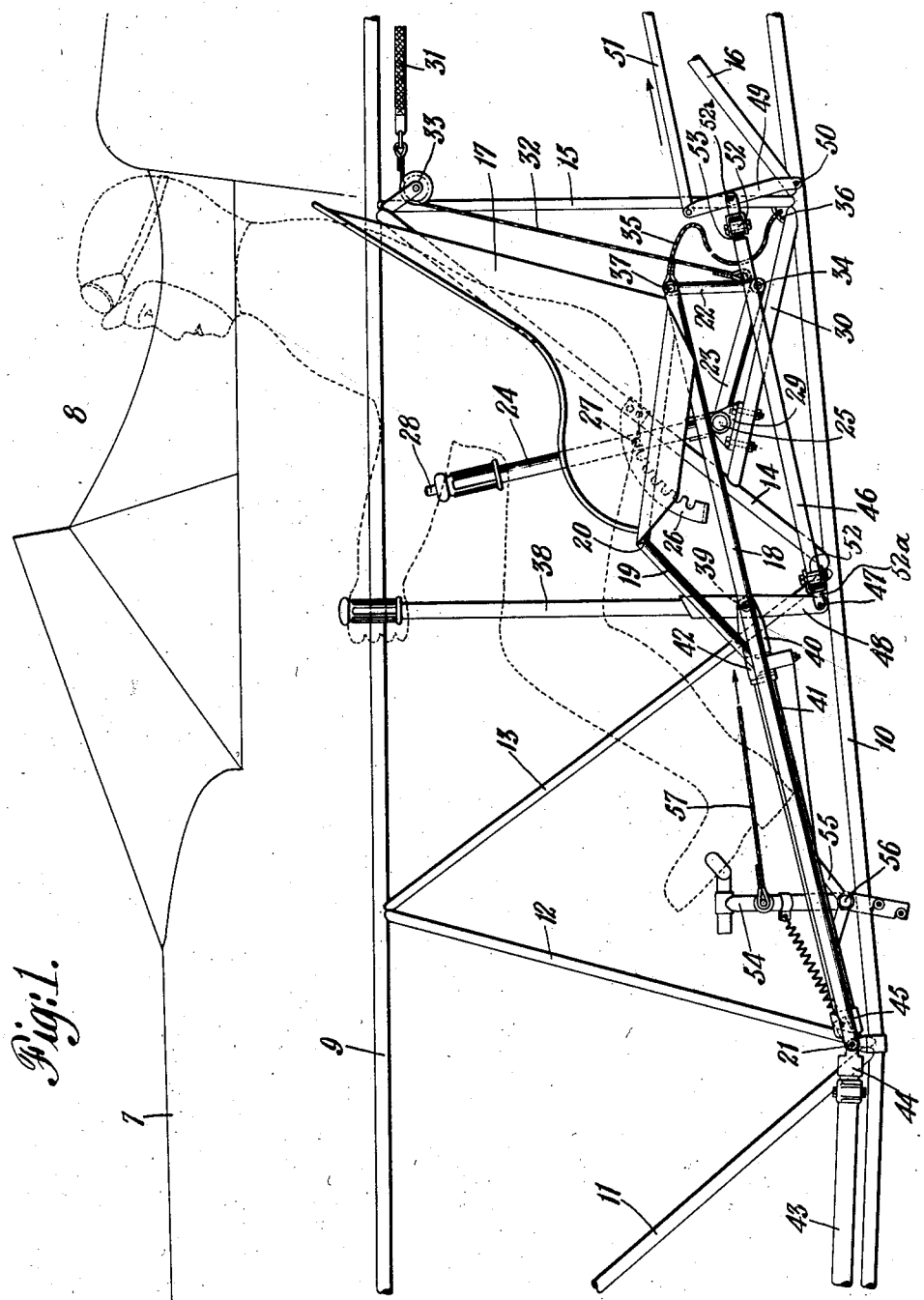
Figure 1 is a somewhat diagrammatic side elevational view of a portion of the fuselage of an aircraft, including certain longérons as well as bracing elements thereof to which the adjustable seat mechanism of this invention has been applied.
Figure 2:
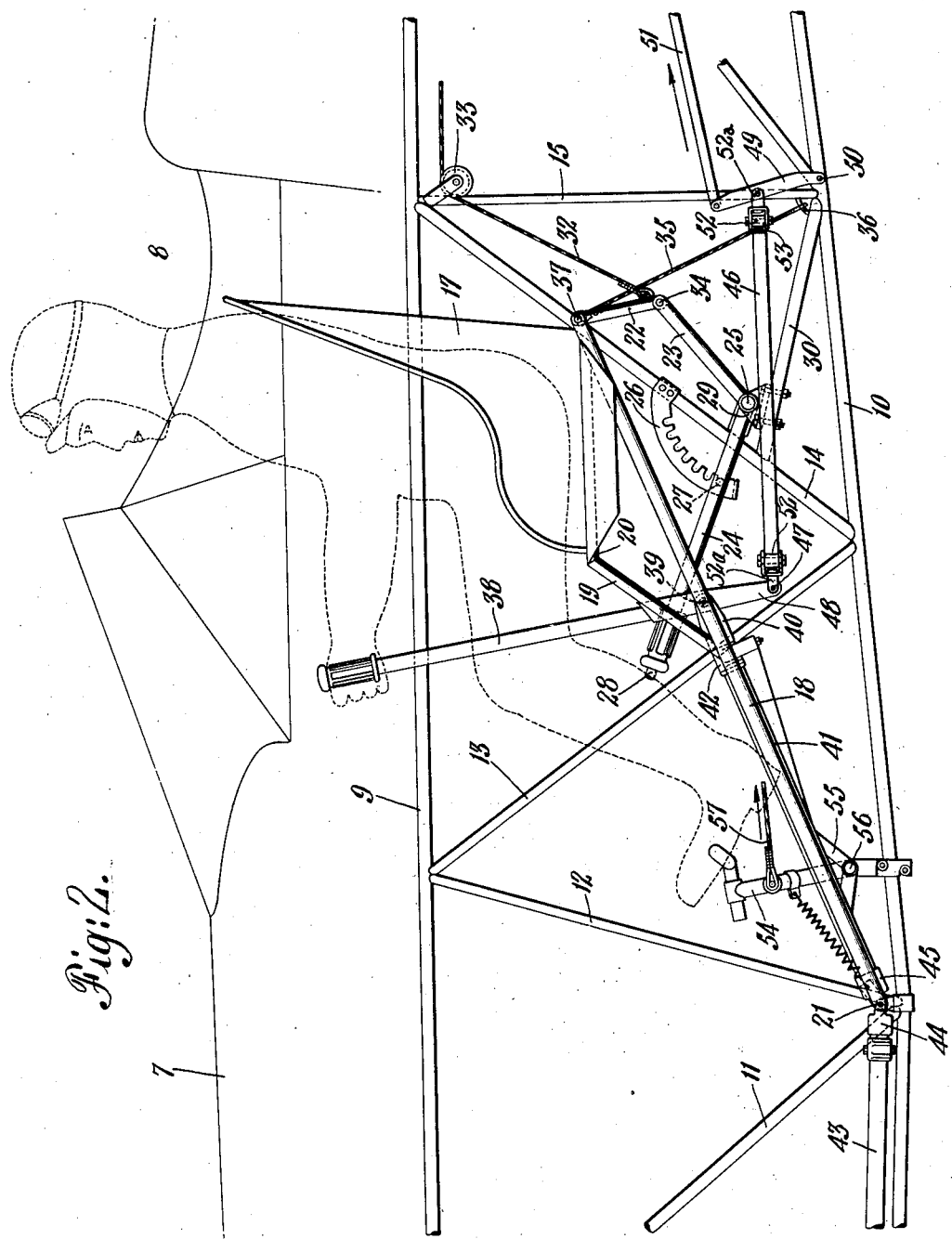
Figure 2 is a view similar to Figure 1 but illustrating the seat and the associated parts adjusted to a somewhat different position.

Referring first to the form of the invention illustrated in Figures 1 and 2, the reference numeral 7 is applied to the fuselage covering, there being a cockpit opening 8 provided in this covering. The fuselage, as shown, is built up on a framework including upper and lower longérons 9—10 and a plurality of bracing elements 11, 12, 13, 14, 15, 16, etc. For the sake of clarity in the drawings, only one side of the fuselage structure has been illustrated therein, although it will be apparent that a structure similar to that indicated by the reference numerals 9 to 16 inclusive may be duplicated at the two sides of the body of the craft.

In Figures 1 and 2 a suitable seat is indicated at 17, the seat being supported on an openwork frame or structure including the members 18 which are extended within the fuselage generally fore and aft thereof adjacent the sides of the frame. Elements 19 and 20 may be employed to mount the seat on the frame members 18.

At their forward ends the members 18 are pivoted to the fuselage structure adjacent the bottom thereof as indicated at 21, while at their other ends the members 18 are connected by means of links 22 to levers 23. The levers 23 are movable with the operating member 24 about the pivot axis 25 and, as will be apparent from inspection of Figures 1 and 2, movement of the control lever 24 results in raising and lowering of the seat on the frame 18 about its pivot 21.

In order that any desired adjustment may be maintained, I prefer to attach or support a quadrant 26 to one of the fuselage bracing elements 14, the quadrant being positioned to cooperate with the pin 27 which may be arranged for actuation by means of the push button 28 disposed at the upper end of the control 24. The support for the axis or bearing 25 may be provided by attaching brackets 29 to a brace or braces 30.

Movements of the operating lever 24 are facilitated preferably by the use of an elastic cord 31 (see Fig. 1) at the forward end of which a cable or wire 32 is extended over the pulley 33 to be attached to and react against the rear portion of the movable frame, for example, by attachment to the pivot 34 which serves to join the operating parts 22 and 23. The other end of the elastic cord 31 may be attached to any fixed part in the fuselage toward the rear end thereof. While, as will be obvious, the elastic device 31 may be replaced by any suitable weight means, I prefer to utilize the arrangement shown since the parts are of very light weight. The elastic, of course, serves to counterbalance a portion of the weight of the pilot and thus permit adjustments of the seat to be made by the exertion of only a relatively small force on the operating lever 24. It is also to be observed in this connection that the weight of the pilot, which, of course, is a variable factor, need not be relied upon for movements of the seat in any direction.

The position of the elastic cord 31 is such that it may readily be extended rearwardly a substantial distance in the fuselage of the craft, so that, even with the relatively long travel movements provided by the seat support, a substantially uniform elastic tension may be provided over the entire range of seat movements.

In order to positively limit upward movement of the seat, a flexible cable or cord 35 may be attached, at one end, to an ear or loop 36 adjacent the bottom longéron 10 and, at its other end, to a portion of the movable frame, for example, the pivot 37 which serves to connect the parts 18 and 22.

The control or "joy-stick" is indicated in Figures 1 and 2 at 38. In accordance with the arrangement here shown, this control is pivoted as at 39 to a terminal portion 40 of a shaft 41. This shaft is journaled in bearings 42 which are fixed with respect to the frame members 18 so that upon pivoting of the frame about the axis 21, the shaft 41 and the pivot point 39 of the control 38 are also moved correspondingly. The shaft 41, furthermore, is operatively coupled with an additional member 43 by means of a universal joint including parts 44 and 45 which are associated with each other for universal movement at a point at least adjacent to and preferably along the line of the pivot axis 21.

With respect to the foregoing, it is to be observed that the use of relatively long frame members 18 in supporting the pilot's seat is of advantage in providing for relatively small variations in the angular extension of flexibly jointed portions of the flight control mechanisms. That is, the pivoting of the relatively long frame members 18, at their forward ends, results in relatively small angular changes, for example, of the control parts 41 and 43, even though the seat adjustments afforded are relatively large. The rotary movement of the part 43, therefore, very closely follows rotation of the part 41, since the two parts of the interconnecting universal 44—45 are never extended at more than a small angle with respect to each other.

As will be understood by those skilled in the art, the forward shaft 43 is operatively coupled with the aileron controls of the craft and it should be noted that adjustment of the seat to different heights or positions does not affect the transmission of torque from the shaft 41 to the shaft 43, since the universal 44—45 permits relative pivotal movement of these two shafts on an axis coinciding with the axis of the pivot 21 for the frame members 18.

The usual elevator movements are provided for by means of a link 46 pivotally joined as at 47 to a downward extension 48 of the stick 38. The link 46 has a pivot joint 52—52a at each end thereof and is operatively connected with an arm 49 which is pivoted to the fuselage as at 50 and which is also coupled to the push rod or rods 51 which are extended rearwardly therefrom to the elevators. The connection between the lever 49 and the link 46, preferably includes a threaded joint 53 which latter provides for rotation of the link 46 about its axis with respect to the universal 52 and the lever 49 when the stick 38 is rocked laterally for aileron control. Any other flexible joint means may be employed in place of the connection 46, 47, 52, 52a and 53 so long as the necessary movements, such as the three incident to the structure shown, are provided. Here again, movements or adjustments of the seat do not affect the elevator control, since the arrangement is such that for a given elevator position the stick 38 and the pilot's seat always remain in substantially the same relative position.

In a manner similar to the above, the rudder control including the members 54, 55 and 56 is also mounted for pivotal movement with the frame members 18 so that the relative position of the pilot's seat and rudder control is not affected or altered by vertical adjustment of the seat. The control cables 57, of course, are extended rearwardly to be connected with the rudder.

Before proceeding with a discussion of the modification of Figure 3, attention is called to the fact that, with the structure of Figures 1 and 2, movement or adjustment of the seat does not alter the relative positions of the control members and the seat itself, it being noted that all of these parts are arranged to pivot as a unit about the axis 21.

According to the arrangement of Figure 3, an additional but slight seat movement is provided for. In this figure, numerous parts of the structure are quite similar to those shown in Figures 1 and 2 and are, therefore, designated by the same reference numerals. The additional seat movement is provided for by pivotal attachment of the seat 17a to the frame members 18, the pivot point being indicated at 58. In addition, a link 59 is pivotally attached as at 60 to an upper portion of the seat 17a as well as to a bracket 61 fixed with respect to the fuselage members 9, etc., this latter pivot being indicated at 62.

The foregoing various parts, as well as others which are also included in Figures 1 and 2, are shown in full lines, in Figure 3, in the positions in which they are located when the seat is at the lower limit of its travel. The dot and dash showing in this figure illustrates the parts when the seat is raised to the upper limit of its movement and, from comparison of Figures 1 and 2 with Figure 3, it will be seen that the additional pivoting of the seat (shown in Figure 3) provides for substantially vertical movement of the pilot without producing the slight forward tilt incident to raising the seat of Figures 1 and 2 from a lower to an upper position. This is advantageous in providing maximum comfort for the pilot or occupant especially when the seat is adjusted to its uppermost position even though adjustment of the seat of Figure 3 produces a slight variation in the relative position of the control stick.

It will be apparent, therefore, that both forms of the invention above described provide for substantially constant relative positions of all the various controls and the pilot's seat. In addition it will also be apparent that the particular type of pivotal mounting employed makes possible adjustment of the seat and controls over a very wide range. Thus, in making long cross-country flights, a pilot may readily position himself well down into the cockpit so that he is amply protected from wind, rain or the like and, at the same time, the pilot may adjust his seat so as to provide a maximum of vision.

With the arrangements shown, furthermore, maximum sensitivity and the "feel" of the controls is always maintained, since the control members and the seat itself are always retained in substantially constant relative positions. Maintaining the "feel" of the controls, of course, is of utmost importance at times when landings are being made.

It is further observed in connection with both forms of structure illustrated that all movable or adjustable parts are pivotally arranged, the result of this being provision for the smoothest possible operation and also ease of lubrication. The pivotal arrangement, furthermore, lends itself readily to the use of means for counterbalancing or compensating for at least a portion of the weight of the pilot and, when such means are employed, as illustrated in the drawings, adjustments may be made with a minimum expenditure of effort on the control lever for the seat.

In conclusion, it is observed that the structure of Figures 1 and 2 has the advantage of accurately maintaining a given relative position of pilot's seat and controls, while the structure of Figure 3 is advantageous in providing a somewhat more direct vertical movement of the pilot so that in upper and lower positions the pilot's head is located at a substantially uniform distance from the windshield or the like which may be employed at the front of the cockpit.

I claim:—

1. For an aircraft, the combination of flight control mechanism, and a support for an occupant, means for adjusting said support to different heights, and a manually operable control member for said mechanism mounted for movement with said support, there being a connection between said mechanism and said member constructed and arranged to maintain substantially the same relative positions between said member and said occupant's support, for a given setting of said mechanism, in different positions of said support.

2. For an aircraft, the combination of a pivoted frame structure, an occupant's seat or support mounted thereon for movement therewith and a flight control element also mounted thereon for movement therewith.

3. For an aircraft, the combination of an elongated frame structure pivoted adjacent its forward end, an occupant's seat or support mounted on the frame structure for movement therewith and a flight control element also mounted for movement with the frame structure.

4. In an aircraft having a flight control mechanism, an occupant's seat adjustable generally vertically to different positions and operating means for said mechanism mounted for upward and downward movement with said seat, together with a flexible connection between the control mechanism and said means arranged to maintain substantially a predetermined relation between the seat and the operating means, for a given setting of said mechanism, in different adjusted positions of the seat.

5. In an aircraft having a flight control mechanism, an occupant's seat with a pivotal supporting structure therefor providing for adjustment of the seat to different heights, and operating means for said mechanism mounted for upward and downward movement with said seat, together with a flexible connection between the control mechanism and said means arranged to maintain substantially a predetermined relation between the seat and the operating means, for a given setting of said mechanism, in different adjusted positions of the seat.

6. In an aircraft having a flight control mechanism, an occupant's seat adjustable generally vertically to different positions and operating means for said mechanism mounted for upward and downward movement with said seat, together with a flexible connection between the control mechanism and said means arranged to maintain substantially a predetermined relation between the seat and the operating means in different adjusted positions of the seat.

7. In an aircraft having a flight control mechanism, an occupant's seat with a pivotal supporting structure therefor providing for adjustment of the seat to different heights, and operating means for said mechanism mounted for movement with said seat, together with a flexible connection between the control mechanism and said means arranged to maintain substantially a predetermined relation between the seat and the operating means in different adjusted position of the seat, said flexible connection including a flexible joint device providing a pivot axis substantially in alignment with a pivot axis of the supporting structure.

8. In an aircraft, a seat, a pivot support for the seat and means for controlling the position of said support on its pivot, together with a control member for the craft mounted in association with said support for pivotal movement therewith.

9. In an aircraft, an occupant's seat, a supporting structure for the seat, a pivotal mounting for said structure having a single pivotal axis located a substantial distance forwardly of the seat to provide for generally upward and downward pivotal movement of the seat about said axis, and means for maintaining the seat in substantially uniform angular relation with respect to the horizontal during upward and downward movement, said means including a pivotal connection between the seat and said member and a pivotal connection between the seat and a fixed part of the craft.

10. In an aircraft, an occupant's seat, a supporting structure for the seat, a pivotal mounting for said structure having a single pivotal axis located a substantial distance forwardly of the seat to provide for generally upward and downward pivotal movement of the seat about said axis, and means for maintaining the seat in substantially uniform angular relation with respect to the horizontal during upward and downward movement, said means including a pivotal connection between a lower part of the seat and said member and a link pivotally connected with an upper part of the seat and with a fixed part of the craft.

11. In an aircraft, a flight control mechanism, an occupant's seat movably mounted for adjustment to different heights, operating means for said mechanism mounted for upward and downward movement generally with said seat and also for control movements, and connection means between said operating means and said control mechanism, said connection means including a flexible device so positioned and arranged with respect to the path of movement of the movable seat mounting as to admit of movement of the seat and the operating means together in a substantially undisturbed relationship without substantially altering the intended monetary position of the said control mechanism.

12. In an aircraft, the combination of a flight control surface, a manually operable member for moving said surface, an occupant's seat, means for pivotally mounting said seat for movement to different positions, means providing for movement of said manually operable member with the pivotal movement of the seat to maintain substantially a predetermined relation therebetween, and means interconnecting said member and said surface including operating connections extended therebetween and pivotally jointed in such manner that a predetermined adjustment of said member with respect to the seat maintains a substantially predetermined setting of said surface in different adjusted positions of the seat.

13. In an aircraft, the combination of a flight control element, a manually operable member for moving said element, an occupant's seat, means for mounting said seat for movement to different positions, means providing for movement of said manually operable member with the movement of the seat to maintain substantially a predetermined relation therebetween, and means interconnecting said member and said element including rigid operating connections pivotally jointed in such manner that a predetermined adjusted position of said member with respect to the seat maintains a substantially predetermined setting of said element in different adjusted positions of the seat.

In testimony whereof I have hereunto signed my name.

WALTER C. CLAYTON.